Patented Aug. 13, 1935

2,010,836

UNITED STATES PATENT OFFICE 2,010,836

REFRACTORY GLASS

Geoffrey Francis Adams, Winchmore Hill, London, Ronald Walter Douglas, Wembley, and John Henry Partridge, High View, Pinner, England No Drawing. Application August 29, 1934, Serial No. 742,022. In Great Britain August 28, 1933

3 Claims. (Cl. 106—36.1)

This invention relates to the manufacture of refractory glasses having high electrical resistances, and more particularly to the manufacture of refractory glasses adapted for the use as envelopes of high-pressure metal-vapour luminous electric discharge tubes.

The development of lamps in which a discharge passes through a metal vapour maintained by the energy of the discharge at a temperature of 400° C. and upwards has led to a demand for glasses having all the following properties:—

(1) The softening point of the glass must be at least 800° C. The softening temperature is to be determined by heating a thread of the glass 25 cm. long and 1 mm. diameter hanging vertically, in such a way that the central 5 cms. of the thread are substantially uniform in temperature and hotter than the remainder, and that the temperature of this central portion rises at the rate of 10° C. per minute. The temperature of this central portion when the thread elongates at the rate of 1 mm. per minute is to be taken as the softening temperature. It corresponds roughly to the temperature at which the viscosity of the glass is $2 \times 10^8$ poises.

(2) The electrical resistance must be at least 2 megohms per centimetre cube at 600° C.

(3) The coefficient of linear expansion, measured between room temperature and 600° C., must be appropriate to that of metals adapted to be used as leading-in wires. If molybdenum is to be used for leading-in wires, the coefficient must lie between $4.4 \times 10^{-6}$ and $5.0 \times 10^{-6}$ per degree C. But glasses with rather lower coefficients (e. g. $3.9 \times 10^{-6}$) can be used with tungsten leading-in wires and those of higher coefficients with nickel-iron leading-in wires.

(4) The glass must be easy to found and have good working properties in the sense recognized by glass blowers.

(5) The glass must corrode as little as possible the refractory materials in contact with which it is founded, in order that the resulting glass should be clear and uncoloured.

The combination of properties (4) and (5) with (1), requires that the difference between the founding and the softening temperature should be much less than it is for the best known group of refractory glasses, with high electrical resistance, namely the borosilicates rich in silica.

The object of this invention is to produce glasses having all the properties (1), (2), (3), (4), (5).

General knowledge of the relation between composition and properties in glass indicates that, if such glasses exist, they must not contain more than 60% of silica and must contain little, if any, alkali metal. It indicates also that lime may be a suitable complement to the silica. For slags high in lime are known to be very "fluid" or, more accurately, to have a viscosity that decreases very rapidly with temperature in the neighbourhood of the softening point. Further the presence of lime, even in large proportions, is known to be consistent with high electrical resistance. Consequently we start with the idea of making lime and silica essential constituents of the glass, and of making the ratio of lime to silica as high as other considerations permit.

Here it is to be observed that other oxides, (such as magnesia, baryta and zinc oxide), which are substitutes for lime in some respects, are not substitutes for the purpose of reducing the difference between the founding and softening temperature. Accordingly in what follows the term lime must be interpreted literally.

But pure lime-silica glasses are very corrosive towards the usual refractory materials and therefore lack property (5). We have found that they can be given this property, without material sacrifice of the others, by the addition to the glass of the material that it mainly attacks in the refractory, namely alumina. A limit to the alumina that can be added is fixed by the glass becoming unworkable.

According to the invention a glass having all the desired properties (1) to (5) contains not more than 60% silica, not more than 2.5% alkalies, more than 12% lime, more than 15% alumina. Preferably the remainder comprises one or more of the following constituents, namely, magnesia, baryta, boric acid, zinc oxide, phosphorus pentoxide. A content of lime greater than 20% usually produces a glass with an expansion coefficient greater than $5.0 \times 10^{-6}$ and may therefore be undesirable; but, if expansion does not matter, up to 30% of lime may be used. The upper limit of alumina increases with that of lime, but generally should not exceed 25%.

Some, but not all, glasses falling within this range of composition also fall within the range of composition claimed in British patent specification No. 242,568. But in that patent specification magnesia, baryta and zinc oxide are regarded as equivalent to lime, and no inferior limit is placed on the content of lime. None of the examples given in that patent specification fall within the range of composition prescribed by the present invention; all contain less than 12% of lime and more than 2½% of alkalies. There is no evidence that any of them possess all of properties (1)—(5); in particular, though they are called refractory glasses, their softening point would probably be lower than is required by (1) and their resistance lower than that required by (2).

The constituents other than silica, lime and alumina play the parts usually associated with them. Thus the boric acid serves as a flux and should be present in an amount at least as great as 5%, except when the silica is very low; it may then be partly replaced by phosphoric acid. Increase or boric acid lowers the softening point, but decreases the coefficient of expansion.

The main use of zinc oxide and baryta is to increase the resistance at high temperatures; but it is difficult to use zinc oxide for this purpose, except in glasses low in silica; in high silica glasses it is apt to produce opalescence. It has little effect in narrowing the difference between softening and founding temperature, which is the function of the lime.

Alkalies are on the whole antagonistic to the properties sought and may be totally omitted.

Magnesia is generally a mere make-weight and has little direct effect on the properties of the glass so long as it is not present to an amount greater than 10%.

Considerable differences may arise between the constitution of the batch and of the finished glass owing to selective loss during founding, especially in small samples. Thus the difference between the compositions denoted by III, V, VI in the provisional specification and those denoted here by Ic, IIa, IIc is due to the fact that the former were batch compositions of small experimental samples and the latter the composition of the resulting glass.

Glasses according to the invention can be divided roughly into two main groups according as they do or do not contain substantial amounts of zinc oxide. Those containing zinc oxide are generally lower in silica. As examples of the first class, the following compositions are typical.

|  | Ia | Ib | Ic |
|---|---|---|---|
|  | Percent | Percent | Percent |
| $SiO_2$ | 51 | 53 | 42 |
| CaO | 15.4 | 16.4 | 13.7 |
| $Al_2O_3$ | 20 | 18 | 23 |
| $(Na.K)_2O$ | 1.6 | 1.6 |  |
| $B_2O_3$ | 5 | 9 | 12.6 |
| MgO | 6.5 |  | 3.5 |
| BaO | .5 | 2 | 5.2 |
| Softening point °C | 918 | 879 | 845 |
| Megohms per cm.³ at 600° | 160 | 50 | 500 |
| Expansion coeft. $\times 10^6$ | 5.2 | 5.1 | 4.7 |

As examples of the second class, the following are typical.

|  | IIa | IIb | IIc |
|---|---|---|---|
|  | Percent | Percent | Percent |
| $SiO_2$ | 40.9 | 43.6 | 29.3 |
| CaO | 21.3 | 14.6 | 25.4 |
| $Al_2O_3$ | 19.7 | 20.4 | 21.1 |
| $(Na.K)_2O$ |  |  |  |
| ZnO | 8.0 | 10.1 | 5.2 |
| $B_2O_3$ | 10.1 | 11.3 | 1.8 |
| $P_2O_5$ |  |  | 7.1 |
| MgO |  |  | 5.2 |
| BaO |  |  | 4.9 |
| Softening point °C | 840 | 840 | 820 |
| Megohms per cm.³ at 600° | 300 | 400 | 170 |
| Expansion coeft. $\times 10^6$ | 6.1 | 4.9 | 7.3 |

The remarkable qualities of glasses, according to the invention, are illustrated in the following table which shows the variation of viscosity with temperature in (A) a commercial soda-lime glass (B) a borosilicate glass of the type known by the trade name Pyrex, (IIb) the glass according to the invention so described. The figures opposite the various temperatures are the logarithms to base 10 of the viscosity in poises. It will be seen that IIb, though harder than (B) at low temperature is nearly as fluid as (A) at high; the difference between softening and founding temperature is therefore very small for a refractory glass.

|  | Glass A | Glass B | Glass IIb |
|---|---|---|---|
| Temp. 900° C | 4.7 | 6.6 | 9.0 |
| 1000° C | 3.9 | 5.6 | 6.5 |
| 1100° C | 3.3 | 4.9 | 4.7 |
| 1200° C | 2.8 | 4.3 | 3.5 |
| 1300° C | 2.6 | 3.7 | 2.8 |

We claim:—

1. A refractory glass comprising from 25 to 45% silica, not more than 2.5% alkalies, from 12 to 27% lime, from 15% to 25% alumina and at least 5% zinc oxide, said glass being a clear one and being easy to found and having good working properties, having a softening point of at least 800° C., an electrical resistance of at least two megohms per centimeter cube at 600° C., and a linear expansion of less than about $5.0 \times 10^{-6}$.

2. A refractory glass comprising from 25 to 45% silica, not more than 2.5% alkalies, from 12 to 27% lime, from 15 to 25% alumina, from 5 to 12% boric acid and at least 5% zinc oxide, said glass being a clear one and being easy to found and having good working properties, having a softening point of at least 800° C., an electrical resistance of at least 2 megohms per cubic centimeter at 600° C. and a linear expansion of less than about $5.0 \times 10^{-6}$.

3. A refractory glass comprising not more than 35% silica, not more than 2.5% alkalies, from 12 to 27% lime, from 15 to 25% alumina, not more than 5% boric acid and at least 5% zinc oxide, said glass being a clear one and being easy to found and having good working properties, having a softening point of at least 800° C., an electrical resistance of at least 2 megohms per cubic centimeter at 600° C. and a linear expansion of less than about $5.0 \times 10^{-6}$.

GEOFFREY FRANCIS ADAMS.
RONALD WALTER DOUGLAS.
JOHN HENRY PARTRIDGE.